(12) United States Patent
Lee et al.

(10) Patent No.: US 9,546,878 B2
(45) Date of Patent: Jan. 17, 2017

(54) MOBILE TERMINAL AND CLOUD SYSTEM USING THE MOBILE TERMINAL

(71) Applicant: LG Electronics Inc., Seoul (KR)

(72) Inventors: Jieun Lee, Seoul (KR); Seongki Sohn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/150,598

(22) Filed: Jan. 8, 2014

(65) Prior Publication Data

US 2014/0229105 A1 Aug. 14, 2014

(30) Foreign Application Priority Data

Feb. 14, 2013 (KR) .................. 10-2013-0016005

(51) Int. Cl.
*G01C 21/00* (2006.01)
*G01C 21/34* (2006.01)

(52) U.S. Cl.
CPC .................. *G01C 21/3407* (2013.01)

(58) Field of Classification Search
None
See application file for complete search history.

(56) References Cited

U.S. PATENT DOCUMENTS

| 5,361,209 A * | 11/1994 | Tsutsumi | 701/37 |
| 8,768,569 B2 * | 7/2014 | Kim et al. | 701/36 |
| 2011/0127127 A1 * | 6/2011 | Hirao et al. | 188/266.2 |
| 2012/0247888 A1 * | 10/2012 | Chikuma et al. | 188/266.1 |
| 2013/0079988 A1 * | 3/2013 | Hirao et al. | 701/38 |
| 2013/0173466 A1 * | 7/2013 | Lepisto et al. | 705/44 |
| 2014/0033238 A1 * | 1/2014 | Jeon et al. | 725/13 |
| 2014/0070925 A1 * | 3/2014 | Shin et al. | 340/12.5 |

* cited by examiner

*Primary Examiner* — Adam Alharbi
(74) *Attorney, Agent, or Firm* — Lee, Hong, Degerman, Kang & Waimey

(57) ABSTRACT

The present disclosure relates to a mobile terminal capable of accessing a cloud server and a cloud system using the same. A mobile terminal according to an embodiment of the present disclosure may include a user input unit configured to select an external terminal for receiving route information stored in a cloud server, a wireless communication unit configured to communicate with the cloud server using radio signals, and a controller configured to control the wireless communication unit to transmit a route information transmission request message to the cloud server so as to transmit the route information to the external terminal from the cloud server.

16 Claims, 16 Drawing Sheets

MOBILE TERMINAL AND CLOUD SYSTEM USING THE MOBILE TERMINAL

RELATED APPLICATION

Pursuant to 35 U.S.C. §119(a), this application claims the benefit of earlier filing date and right of priority to Korean Application No. 10-2013-0016005, filed on Feb. 14, 2013, the contents of which is incorporated by reference herein in its entirety.

BACKGROUND OF THE INVENTION

1. Field of the Invention

The present disclosure relates to a mobile terminal capable of accessing a cloud server and a cloud system using the same.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

As the function of the terminal is enhanced as described above, the terminal can support a function capable of extending the function of the terminal through communication with an electronic device and a cloud server at the outside thereof.

SUMMARY OF THE INVENTION

An objective of the present disclosure is to provide a mobile terminal capable of extending the function of the mobile terminal using a cloud server and a third electronic device, and a cloud system using the same.

In order to accomplish the foregoing objective, a mobile terminal according to an embodiment of the present disclosure may include a user input unit configured to select an external terminal for receiving route information stored in a cloud server, a wireless communication unit configured to communicate with the cloud server using radio signals, and a controller configured to control the wireless communication unit to transmit a route information transmission request message to the cloud server so as to transmit the route information to the external terminal from the cloud server.

According to an embodiment, the mobile terminal may further include a navigation unit configured to search a travel route for reaching a destination corresponding to destination information received through the user input unit, wherein the controller controls the wireless communication unit to transmit route information corresponding to the retrieved travel route to the cloud server.

According to an embodiment, the controller may display a select window containing at least one external terminal information to select the external terminal when the retrieval of the travel route is completed.

According to an embodiment, the select window may include at least part of contact information contained in a previously stored phone book.

According to an embodiment, the controller may control the wireless communication unit to transmit the received destination information to the cloud server, and when route information corresponding to a travel route for at least one of the transmitted destination information is requested from the cloud server, the controller may control the navigation unit to search a travel route corresponding to the requested route information.

According to an embodiment, the mobile terminal may further include a memory configured to store history information corresponding to route information retrieved from a web site accessed through the wireless communication unit, wherein the history information is stored in the sequence of retrieving the route information.

According to an embodiment, the controller may control the wireless communication unit to transmit the history information to the cloud server, and transmit the route information transmission request message to the cloud server to transmit the history information stored in the cloud server to the external terminal based on the user's request.

A mobile terminal according to an embodiment of the present disclosure may include a wireless communication unit configured to receive route information from a cloud server, and a controller configured to control a display unit to display the route information, wherein the route information is received based on a route information transmission request message transmitted to the cloud server through the wireless communication unit or received based on a route information reception request message transmitted from the external terminal.

According to an embodiment, the controller may control the display unit to display a map corresponding to the route information in response to the route information being received, and the route information may be displayed along with the displayed map.

According to an embodiment, the mobile terminal may further include a mobile terminal body, wherein the route information transmission request message comprises the location information of the body.

According to an embodiment, a popup window for selecting whether or not to receive the route information from the cloud server may be displayed on the display unit when the route information reception request message is received from the external terminal.

According to an embodiment, the route information may be received at predetermined time intervals or received whenever a predetermined event exists on the route information.

According to an embodiment, the mobile terminal may further include a user input unit configured to receive destination information, wherein the controller controls the wireless communication unit to transmit a route information transmission request message containing the destination information to the cloud server.

According to an embodiment, the controller may receive a plurality of destination information from the cloud server, and allow at least one destination information selected by the user among the plurality of received destination information to be contained in the route information transmission request message so as to transmit the route information transmission request message to the cloud server.

According to an embodiment, route information corresponding to at least one destination information contained in the route information transmission request message may be received from the cloud server.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
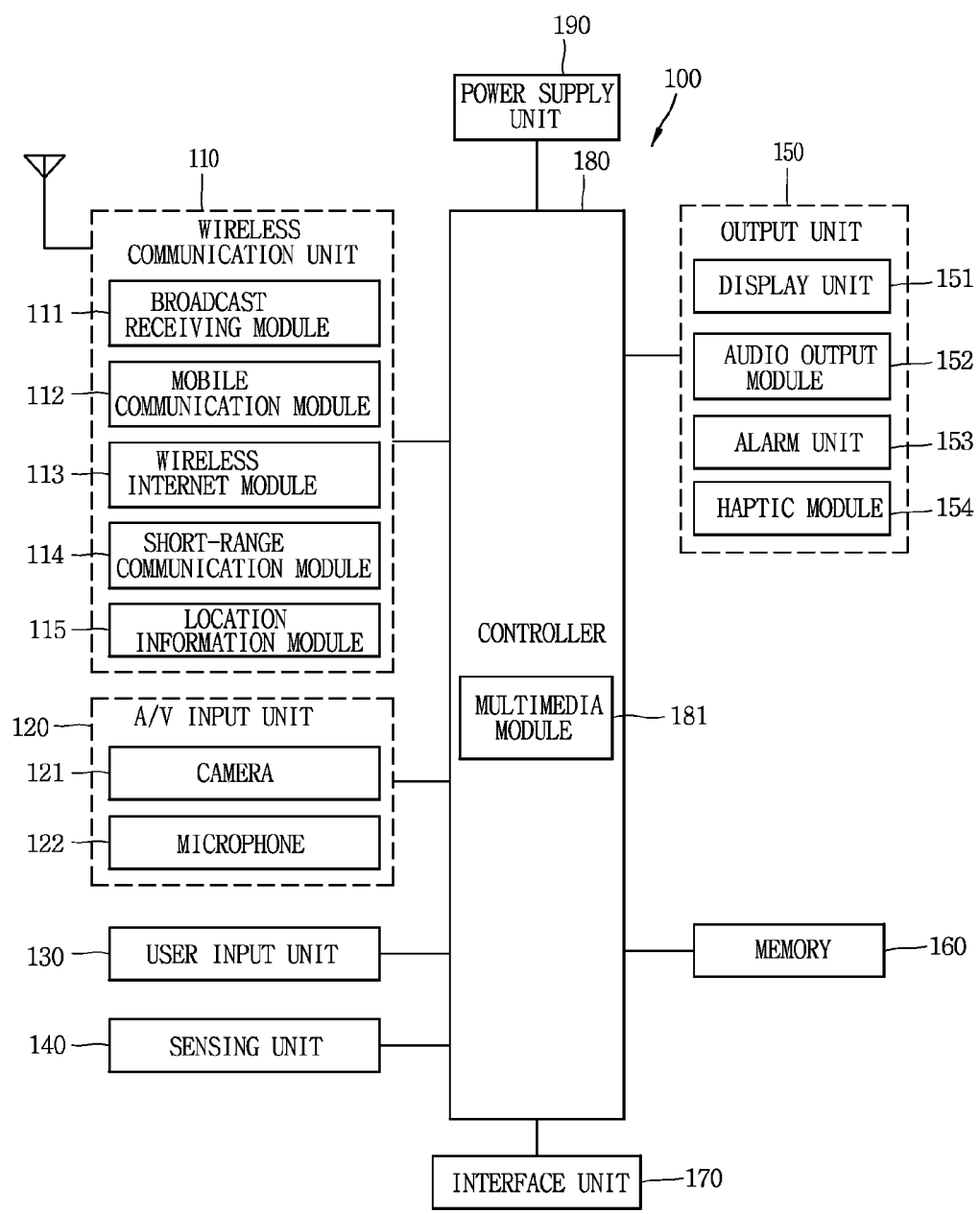
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the NV (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The sensing unit 140 may include a proximity sensor 141, a stereoscopic touch sensing unit 142, an ultrasonic sensing unit 143 and a camera sensing unit 144. The sensing unit 140 may be configured with a three-dimensional sensor for detecting the location of an object (hereinafter, referred to as a "sensing object") that exists and moves in a three-dimensional space. Here, the sensing object may be part (finger) of the user's body, an accessory device and the like.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller.

The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via the interface unit 170.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Hereinafter, a mobile terminal according to an embodiment of the present disclosure as illustrated above in FIG. 1 or a mobile terminal disposed with the constituent elements of the mobile terminal or the structure of a mobile terminal will be described.

Figure 2A:
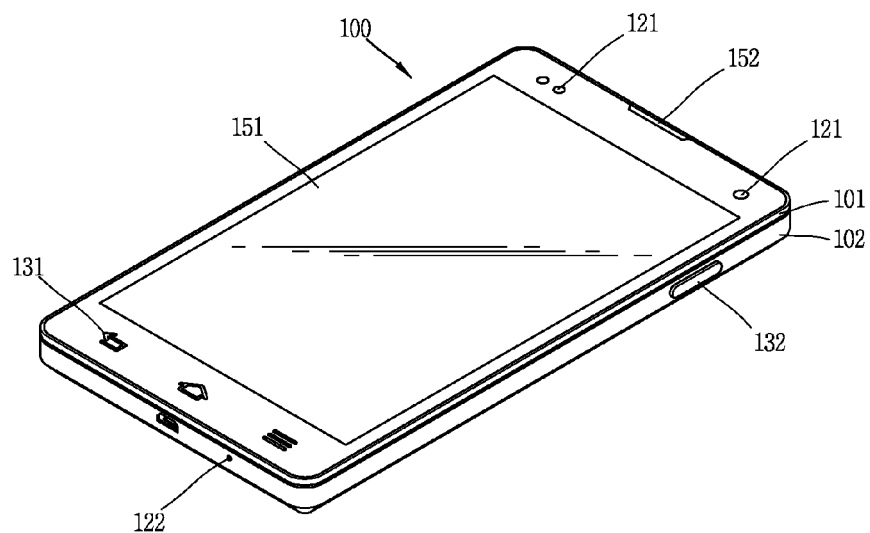
FIGS. 2A and 2B are perspective views illustrating the external appearance of a mobile terminal according to an embodiment of the present disclosure.
Figure 2B:
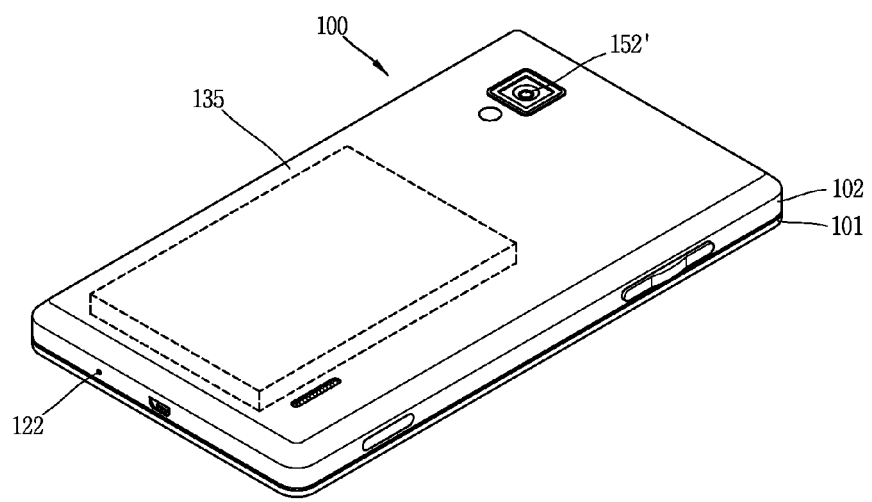

FIG. 2A is a front perspective view illustrating a mobile terminal according to the present disclosure or an example of the mobile terminal, and FIG. 2B is a rear perspective view illustrating a mobile terminal illustrated in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Referring to FIG. 2B, an audio output unit 152' may be additionally disposed on a rear surface, namely, a rear case 102, of the terminal body. The audio output unit 152' together with the audio output unit 152 (refer to FIG. 2A) can implement a stereo function, and it may be also used to implement a speaker phone mode during a phone call.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

Furthermore, an audio output unit 252' may be additionally disposed on a rear surface of the terminal body. The audio output unit 252' together with the audio output unit 252 (refer to FIG. 2A) can implement a stereo function, and it may be also used to implement a speaker phone mode during a phone call.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Figure 3A:
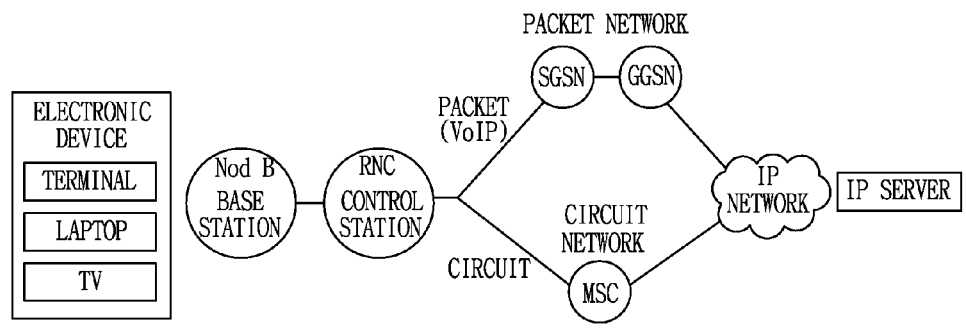
FIG. 3A is a conceptual view illustrating a cloud system communication network according to an embodiment of the present disclosure.

FIG. 3A is a conceptual view illustrating a cloud system communication network according to an embodiment of the present disclosure. The cloud system communication network is configured with an electronic device and an Internet protocol (IP) server.

Referring to FIG. 3A, the electronic device may include all wireless communication enabled electronic devices such as a mobile terminal, a laptop, a television, and the like.

The electronic device may transmit data to a RNC control station through a Node B base station. The radio network controller (RNC) control station may be also referred to as a wireless network control station. The RNC control station may perform a function for the wireless resource management of an asynchronous type international mobile communication system and a management function for a base station in a wireless subscriber network and a management function for an interface between a wireless network controller and other network elements.

Data transmitted to the RNC control station may be transmitted to the IP server through a network. The network can be classified into a packet network and a circuit network.

In other words, in case where data is divided into packet units and transmitted to the IP server through a different route for each packet when wireless communication is connected from the electronic device to the IP server, it is said that data is transmitted to the IP server through a packet network. In this case, a data path can be commonly used with other packets during the transmission of data.

On the contrary, in case where data is transmitted to the IP server through the same route from the beginning to the release of wireless communication when wireless communication is connected, it is said that data is transmitted to the IP server through a circuit network. In this case, a determined data path can be exclusively used during the transmission of data.

More specifically, a packet network may include SGSN and GGSN.

Here, SGSN (Serving GPRS Support Node) may be also referred to as a packet exchange support node. SGSN denotes a node in charge of data packet transfer to a mobile station within a service region. SGSN can perform a packet routing and transmission function. The location register of SGSN may store the location information of a GPRS (General Packet Radio Service) user registered in SGSN, a user profile (for example, International Mobile Subscriber Identity (IMSI), and the like.

Next, GGSN (Gateway GPRS Support Node) may be also referred to as a packet gateway support node. GGSN denotes an access function between a GPRS backbone network and an external packet data network. GGSN may perform a function of converting a GRPS packet received from SGSN into a suitable packet data protocol (PDP) format to transmit it to the IP server, and converting the PDP address of incoming packet data into the GSM (Global System for Mobile communication) address of a recipient. Furthermore, GGSN may store the address of an SGSN user stored in the location register of SGSN and a user profile.

On the other hand, circuit network may include an MSC (Mobile Switching Center). MSC may be also referred to as a mobile switching center, and control an overall system.

Specifically, MSC may select a route through which data received from the RNC control station is to be transmitted to the IP server. To this end, MSC may perform a control function required for the mobility of electronic devices and the efficient use of frequency resources. Furthermore, MSC may process signals transmitted from or received at Node B base stations, and perform a central control function for coordinating Node B base stations to be efficiently used.

As described above, data can be transmitted to a RNC control station through a Node B base station from electronic devices, and the data transmitted to the RNC control station can be transmitted to the IP server through a packet network and a circuit network.

Figure 3B:
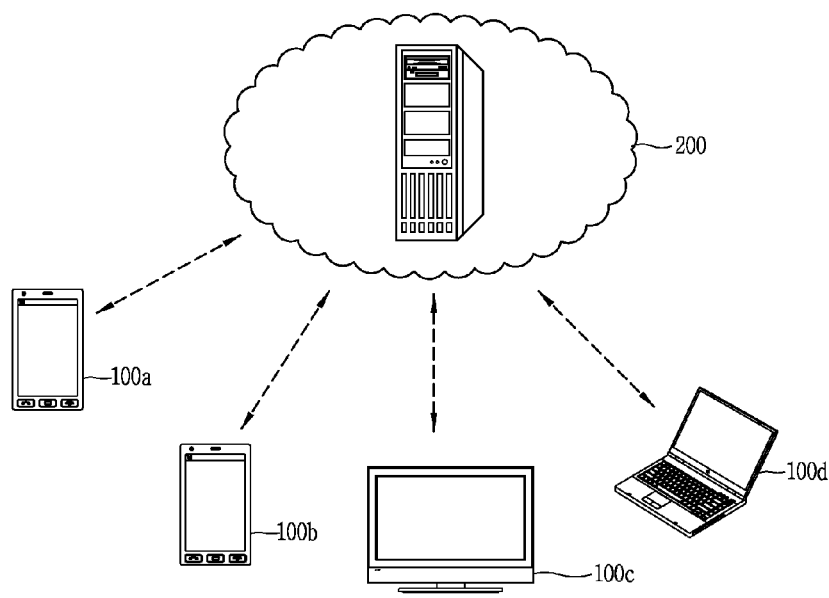
FIG. 3B is a conceptual view illustrating a cloud server according to an embodiment of the present disclosure.

FIG. 3B is a conceptual view illustrating a cloud server according to an embodiment of the present disclosure. As illustrated in FIG. 3B, the cloud system may include a cloud server 200 and at least one electronic device 100a, 100b, 100c, 100d.

Here, the electronic device may be at least one of wireless communication enabled electronic devices such as a mobile terminal, a laptop, a television, and the like as illustrated in FIG. 3A.

The cloud server 200 denotes a high-capacity database capable of integrating and providing various information stored in the electronic devices 100a, 100b, 100c, 100d physically existing at different locations with a virtualization technology. In this manner, the cloud server 200 can distributedly process, or reprocess, or transmit data stored in the high-capacity database to at least one electronic device 100a, 100b, 100c, 100d. In other words, the cloud server 200 may store software and data in a data central computer (or central server) connected to the Internet. Accordingly, the user can receive software or data stored in the central computer again whenever he or she accesses the cloud server 200 through the electronic device.

On the other hand, the electronic device 100a, 100b, 100c, 100d in connection with the cloud server 200 may include at least one wireless communication protocol, and access the cloud server 200 through the provided wireless communication protocol. The electronic device 100a, 100b, 100c, 100d and the cloud server 200 can be accessed through a wireless network. Any one of Wi-Fi (Wireless-Fidelity), 3G (Generation) communication scheme, 4G (Generation) communication scheme, DLNA (Digital Living Network Alliance), NFC (Near Field Communication) and BT (BlueTooth) communication scheme may be used for the wireless network, thereby allowing the electronic devices 100a, 100b, 100c, 100d and the cloud server 200 to be accessed through the wireless network.

On the other hand, the cloud server 200 and the electronic device being "accessed" may be expressed as the electronic device 100a, 100b, 100c, 100d and the cloud server being "paired, synchronized or connected". It denotes a state in which information can be transmitted between the electronic device 100a, 100b, 100c, 100d and the cloud server 200, namely, being connected to transmit effective data.

In this manner, an access between the cloud server 200 and the electronic device 100a, 100b, 100c, 100d can be achieved based on a request from at least one side of the cloud server 200 and the electronic device 100a, 100b, 100c, 100d. Furthermore, the cloud server 200 can access a plurality of electronic devices 100a, 100b, 100c, 100d at the same time, and transmit information received from any one electronic device to another electronic device based on the user's request.

Hereinafter, a method of sharing route information between a mobile terminal and a mobile terminal or between a mobile terminal and an electronic device using such a cloud system will be described in more detail with reference to the accompanying drawings.

On the other hand, in the following embodiment, the electronic device will be described as a mobile terminal, for example, and the mobile terminal may include at least one of the foregoing constituent elements that have been illustrated in FIGS. 1, 2A and 2B.

Figure 4A:
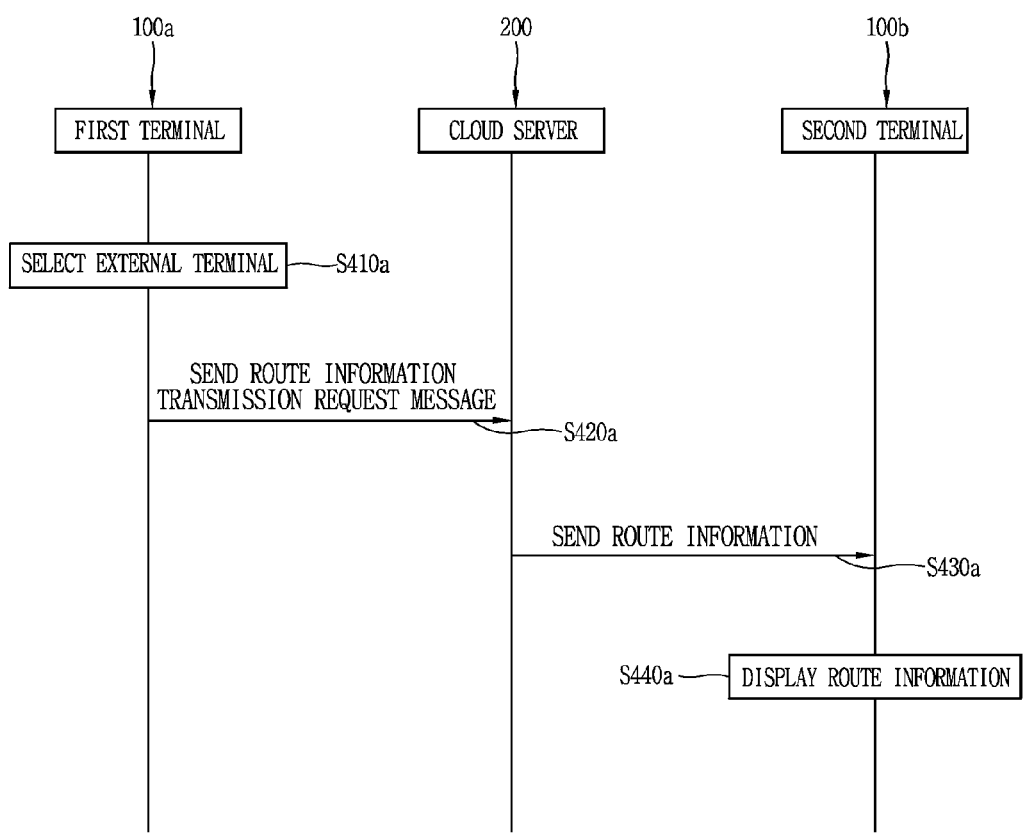
FIGS. 4A and 4B are flow charts for explaining a method of sharing route information using a cloud system according to an embodiment of the present disclosure.
Figure 4B:
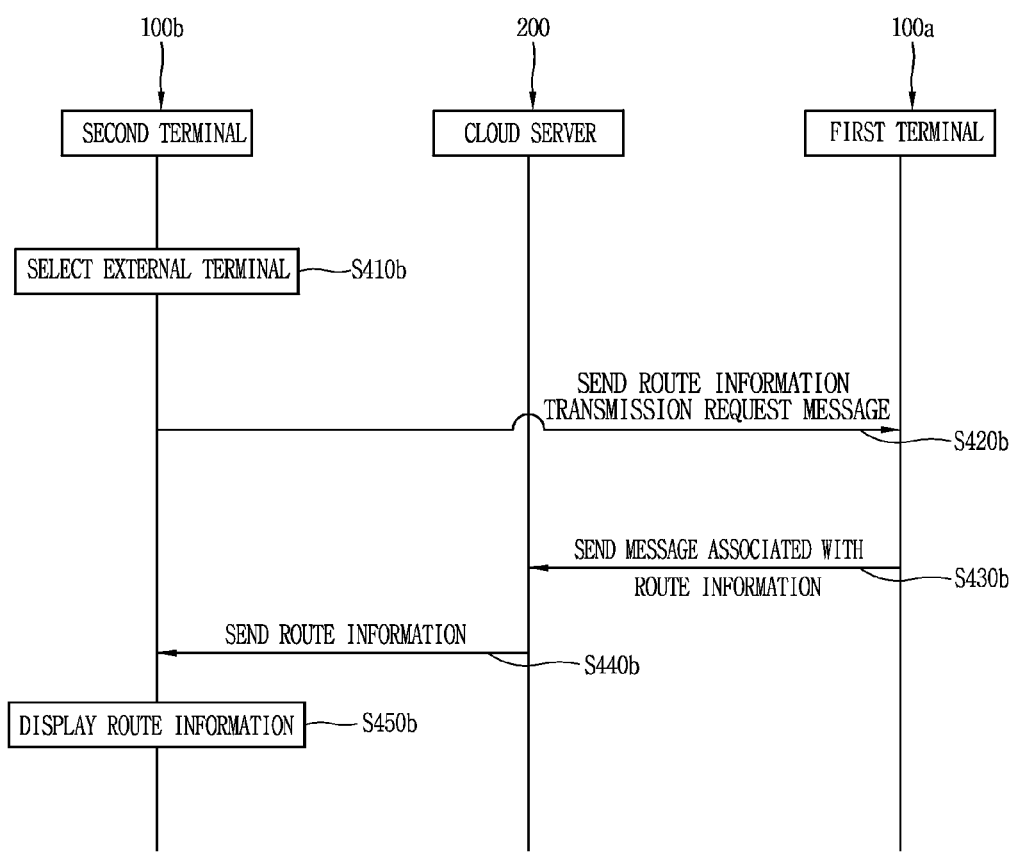

In an embodiment according to FIGS. 4A and 4B, a cloud system including a first terminal 100a, a second terminal 100b and cloud server 200 will be described as an example. In this manner, a cloud system including the first terminal 100a, the second terminal 100b, and the cloud server 200 can perform a route information sharing service. The route information sharing service denotes a service for transmitting route information retrieved from the first terminal 100a, between the first and the second terminal, to the second terminal 100b from the cloud server 200.

The route information can be transmitted to the cloud server 200 and then transmitted to the second terminal 100b immediately when retrieved from the first terminal 100a. Furthermore, the route information can be uploaded to the cloud server 200 from the first terminal 100a, and then transmitted to the second terminal 100b when there is a request from the second terminal 100b or first terminal 100a afterwards.

In this manner, the second terminal 100b may receive route information transmitted from the first terminal 100a and cloud server 200 to display the route information (or travel route) using at least one of the visual, auditory and tactile schemes. Accordingly, the user of the second terminal 100b can receive a travel route even when a navigation function is not provided on the second terminal 100b.

On the other hand, a case where route information is uploaded on the cloud server to provide the route information to the second terminal from the first terminal can be largely classified into two embodiments. According to one embodiment, the route information may be transmitted to the second terminal by a request of the first terminal at the side of providing the route information. Furthermore, according to another embodiment, the route information may be transmitted to the second terminal from the cloud server by a request of the second terminal at the side of receiving the route information.

Hereinafter, the two embodiments will be described in more detail with reference to FIGS. 4A and 4B.

First, an embodiment of transmitting route information to the second terminal by a request of the first terminal will be described with reference to FIG. 4A.

First, in order to provide route information to the second terminal 100b, the process of allowing the first terminal 100a to select an external terminal which is to receive the route information, namely, the second terminal 100b, will be carried out (S410a). In other words, the user of the first terminal 100a may select a target device for performing a route information sharing service.

For an example, the first terminal 100a may receive any one contact from the user in a state that a phone book or contact list stored in the memory is displayed on the display unit, thereby achieving the selection of the second terminal 100b.

On the other hand, the controller 180 of the first terminal 100a may transmit the identification information of the selected second terminal 100b to the cloud server. Here, the identification information of the second terminal 100b may have been previously stored in the first terminal 100a as described above, and otherwise, may be directly received from the user.

Here, the identification information of the second terminal 100b may be an uniform resource identifier (URI), and more particularly, at least one of Tell URI and SIP URI.

In this manner, when the first terminal 100a selects the second terminal 100b for performing a route information sharing service along therewith (S410a), the process of transmitting a route information transmission request message to the cloud server 200 to transmit route information to the second terminal 100b through the cloud server 200 is carried out in the first terminal 100a (S420a).

In this case, the first terminal 100a can transmit route information to be transmitted to the second terminal 100b along with the route information transmission request message to the cloud server 200.

Furthermore, the route information to be transmitted to the second terminal 100b may have been previously stored in the cloud server 200, and in this case, the route information transmission request message may include identification information for specifying route information to be transmitted to the second terminal 100b among route information stored in the cloud server 200.

On the other hand, even though the route information sharing service is not carried out, when the route information is retrieved, the first terminal 100a may upload the retrieved route information to the cloud server 200 according to the user's selection or a preset option. Furthermore, the route information may be uploaded to the cloud server 200 in real time or at predetermined intervals. Moreover, the route information can be uploaded to the cloud server 200 according to the communication scheme of the first terminal 100a. In other words, when the first terminal 100a is set to a first communication scheme (for example, 3G or 4 G communication scheme) for which data charge is billed, the first terminal 100a may not upload the retrieved route information to the cloud server 200. Furthermore, when the first terminal 100*a* is set to a second communication scheme (for example, Wi-Fi communication scheme) for which data charge is not billed, the first terminal 100*a* may upload the retrieved route information to the cloud server 200. Furthermore, in case where route information has not been uploaded in a first communication scheme mode, but then the mode is switched to a second communication scheme mode, the first terminal 100*a* can upload route the information to the cloud server 200.

On the other hand, the steps S410, S420 may be carried out without being restricted to the serial sequence. In other words, the first terminal 100*a* may first request a route information sharing service to the cloud server 200 based on the user's selection, and then a target device (or external terminal), namely, the second terminal 100*b*, may be selected by the user.

On the other hand, as described above, when a route information transmission request message is received at the cloud server 200 as described above, the process of transmitting route information from the cloud server 200 to the second terminal 100*b* is carried out (S430).

On the other hand, the format of route information transmitted to the second terminal 100*b* from the cloud server 200 may be configured in various ways, and thus the detailed description thereof will be omitted.

On the other hand, the process of displaying the transmitted route information is carried out in the second terminal 100*b* that has received route information from the cloud server 200 (S440*a*).

The second terminal 100*b* may display route information using at least one of the visual, auditory and tactile schemes. For example, the second terminal 100*b* may output an electronic map and then display the transmitted route information thereon. Furthermore, the second terminal 100*b* can display route information through at least one of the text and audio formats.

As described above, a method of transmitting route information from the cloud server 200 to the second terminal 100*b* based on a request of the first terminal 100*a* which is an object for providing route information has been described with reference to FIG. 4A. Hereinafter, a method of transmitting route information from the cloud server 200 to the second terminal 100*b* based on a request of the second terminal 100*b* which is an object for receiving route information will be described with reference to FIG. 4B.

First, in the second terminal 100*b*, the process of selecting an external terminal which is an object for providing route information, namely, the first terminal 100*a*, to provide the route information is carried out (S410*b*). In other words, the user of the second terminal 100*b* can select a target device for performing a route information sharing service.

For an example, the second terminal 100*b* may receive any one contact from the user in a state that a phone book or contact list stored in the memory is displayed on the display unit, thereby achieving the selection of the first terminal 100*a*.

On the other hand, the controller 180 of the second terminal 100*b* may transmit the identification information of the selected first terminal 100*a* to the cloud server. Here, the identification information of the first terminal 100*a* may have been previously stored in the second terminal 100*b* as described above, and otherwise, may be directly received from the user.

Here, the identification information of the first terminal 100*a* may be an uniform resource identifier (URI), and more particularly, at least one of Tell URI and SIP URI.

In this manner, when the second terminal 100*b* selects the first terminal 100*a* for performing a route information sharing service along therewith (S410*b*), the process of transmitting a route information transmission request message to the first terminal 100*a* is carried out in the second terminal 100*b* (S420*b*). Meanwhile, the route information transmission request message may be transmitted to the first terminal 100*a* through the cloud server 200 other than being directly transmitted to the first terminal 100*a*. In other words, the second terminal 100*b* may transmit a route information transmission request message to the cloud server 200, and the cloud server 200 may transmit the route information transmission request message again to the first terminal 100*a*.

On the other hand, the route information transmission request message may include information associated with at least one of the current location, departure and destination of the second terminal 100*b*.

When the route information transmission request message is transmitted to the first terminal 100*a* as described above (S420*b*), the process of transmitting a message associated with route information to the cloud server 200 to transmit the route information to the second terminal 100*b* through the cloud server 200 is carried out in the first terminal 100*a* (S430*b*).

Here, the message associated with route information may include route information to be transmitted to the second terminal 100*b*. Furthermore, the route information to be transmitted to the second terminal 100*b* may have been previously stored in the cloud server 200, and in this case, the message associated with the route information may include identification information for specifying route information to be transmitted to the second terminal 100*b* among route information stored in the cloud server 200.

On the other hand, even though the route information sharing service is not carried out, when the route information is retrieved, the first terminal 100*a* may upload the retrieved route information to the cloud server 200 according to the user's selection or a preset option. Furthermore, the route information may be uploaded to the cloud server 200 in real time or at predetermined intervals. Moreover, the route information can be uploaded to the cloud server 200 according to the communication scheme of the first terminal 100*a*. In other words, when the first terminal 100*a* is set to a first communication scheme (for example, 3G or 4 G communication scheme) for which data charge is billed, the first terminal 100*a* may not upload the retrieved route information to the cloud server 200. Furthermore, when the first terminal 100*a* is set to a second communication scheme (for example, Wi-Fi communication scheme) for which data charge is not billed, the first terminal 100*a* may upload the retrieved route information to the cloud server 200. Furthermore, in case where route information has not been uploaded in a first communication scheme mode, but then the mode is switched to a second communication scheme mode, the first terminal 100*a* can upload route the information to the cloud server 200.

On the other hand, as described above, when a message associated with route information is received at the cloud server 200 as described above, the process of transmitting route information from the cloud server 200 to the second terminal 100*b* is carried out (S430).

On the other hand, the format of route information transmitted to the second terminal 100*b* from the cloud server 200 may be configured in various ways, and thus the detailed description thereof will be omitted.

On the other hand, the process of displaying the transmitted route information is carried out in the second terminal 100b that has received route information from the cloud server 200 (S440a).

The second terminal 100b may display route information using at least one of the visual, auditory and tactile schemes. For example, the second terminal 100b may output an electronic map and then display the transmitted route information thereon. Furthermore, the second terminal 100b can display route information through at least one of the text and audio formats.

As described above, according to a cloud system according to an embodiment of the present disclosure, when there is no navigation function in the second terminal or the user of the second terminal wants to travel the same route as the destination of the first terminal, route information retrieved through the first terminal may be transmitted to the second terminal, thereby acquiring route information from the cloud server without searching an additional route.

Figure 5:
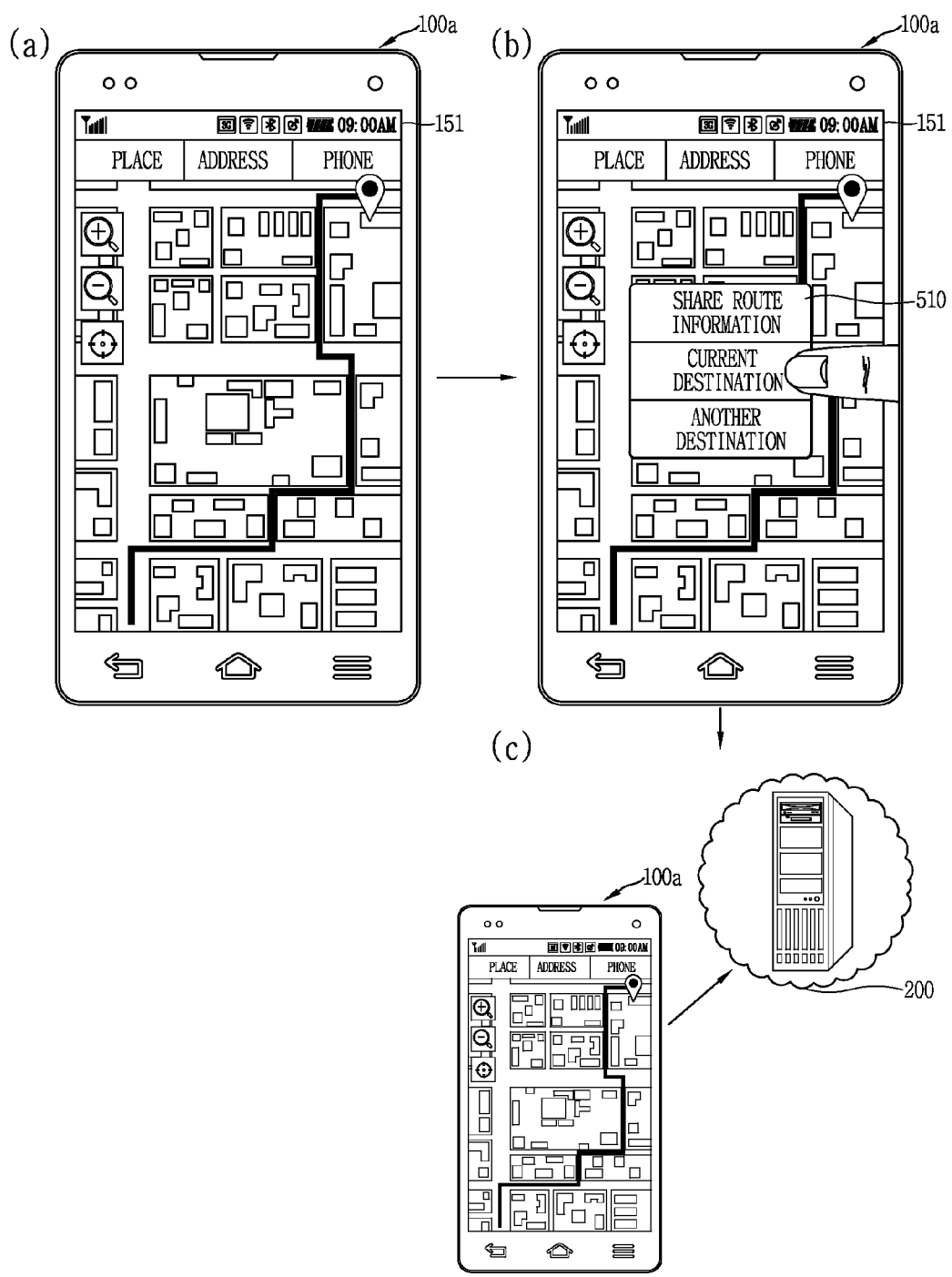
FIG. 5 is a conceptual view for explaining a method of sharing route information in a mobile terminal according to an embodiment of the present disclosure.
Figure 6:
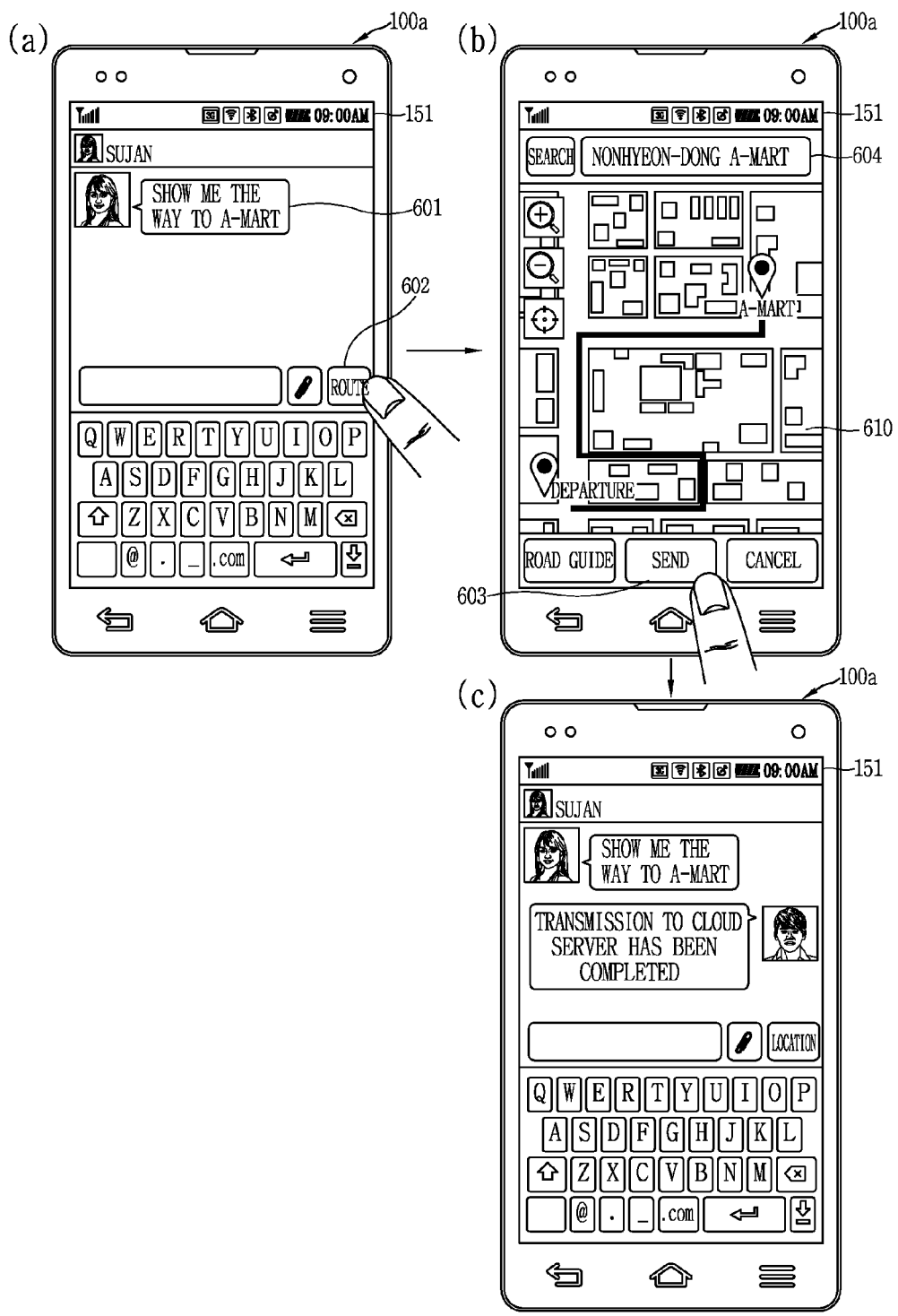
FIGS. 6, 7, 8 and 9 are conceptual views for explaining a method of sharing route information in a mobile terminal according to an embodiment of the present disclosure.

Hereinafter, a method of uploading route information to the cloud server from the first terminal will be described in more detail with reference to the accompanying drawings. FIG. 5 is a conceptual view for explaining a method of sharing route information in a mobile terminal according to an embodiment of the present disclosure.

A mobile terminal according to an embodiment of the present disclosure, for example, the first terminal 100a at the side of transmitting route information, may transmit route information retrieved from the first terminal 100a as illustrated in FIG. 5A to the cloud server (refer to FIG. 5C) based on the user's selection as illustrated in FIG. 5B.

Here, when a navigation function is carried out and thus a destination for route guide has been previously set in the first terminal 100a, the retrieved route information may be a route corresponding to the preset destination.

Furthermore, the first terminal 100a may newly search another destination other than the current set destination based on the user's selection to transmit route information corresponding to the newly retrieved destination to the cloud server 200 as illustrated in FIG. 5B.

On the other hand, the route information may be transmitted to the cloud server 200 in connection with a route information sharing service being carried out as illustrated above in FIGS. 4A and 4B. Furthermore, when a route is retrieved from the first terminal 100a, the route information may be automatically transmitted to the cloud server 200. In this case, a plurality of route information received from the first terminal 100a may have been previously stored in the cloud server 200.

On the other hand, route information transmitted to the cloud server 200 may be a travel route corresponding to the destination currently set in the first terminal 100a. Furthermore, the first terminal 100a may newly enter a new departure other than the currently set departure, and transmit route information corresponding to the newly entered departure to the cloud server 200. Meanwhile, information on the new departure may be arbitrarily set by the user of the first terminal 100a or received from the second terminal 100b (not shown) or cloud server 200.

On the other hand, the first terminal 100a may be configured with various graphical user interfaces (GUIs) other than the illustration for performing a route information sharing service. Furthermore, the function may be carried out through an application corresponding to the navigation function installed in the first terminal 100a.

Hereinafter, a method of sharing route information in various ways in the first terminal based on a request of the second terminal will be described in more detail with reference to the accompanying drawings. FIGS. 6, 7, 8 and 9 are conceptual views for explaining a method of sharing route information in a mobile terminal according to an embodiment of the present disclosure.

As described above in FIG. 5, a method of sharing route information from the first terminal 100a to the second terminal 100b through a navigation function application implemented in a separate manner has been described. Meanwhile, in a mobile terminal according to an embodiment of the present disclosure, route information can be immediately transmitted to an external terminal as the need arises while performing another function application installed in the mobile terminal even when a navigation function application is not used in a separate manner.

For an example, as illustrated in FIG. 6A, when route information transmission is requested from the second terminal 100b through a message function application, the controller of the first terminal 100a may transmit route information to the second terminal 100b using an additional function provided in the message function application.

For example, a function icon 602 associated with route information transmission may be displayed on the display unit 151 in a state that the message function application is being carried out. When the route information icon 602 is selected by the user, the controller 180 may implement a navigation function to search route information as illustrated in FIG. 6B. Meanwhile, when the navigation function is carried out, the controller may extract destination information using a message in the message function application, and then automatically extract route information associated with a destination corresponding to the extracted destination information through the navigation function. Meanwhile, in this case, the destination can be entered from the user without being automatically extracted.

On the other hand, as illustrated in FIG. 6B, when route information extraction is completed, the first terminal 100a may transmit the extracted route information to the cloud server to allow the second terminal 100b to receive the extracted route information. Furthermore, as illustrated in FIG. 6C, when the upload of the route information to the cloud server is completed, the controller of the first terminal 100a may transmit the information to the second terminal 100b or display it on the display unit of the first terminal 100a using a popup window.

On the other hand, the controller of the first terminal 100a may receive information (refer to reference numerals 621, 622) on the departure and arrival (or destination) corresponding to route information to be retrieved. Meanwhile, information on at least one of the departure and arrival can be received from the second terminal 100b. When information on at least one of the departure and arrival is received from the second terminal 100b, the controller of the first terminal 100a may automatically use at least one of the departure and arrival s information for searching route information.

Figure 7:
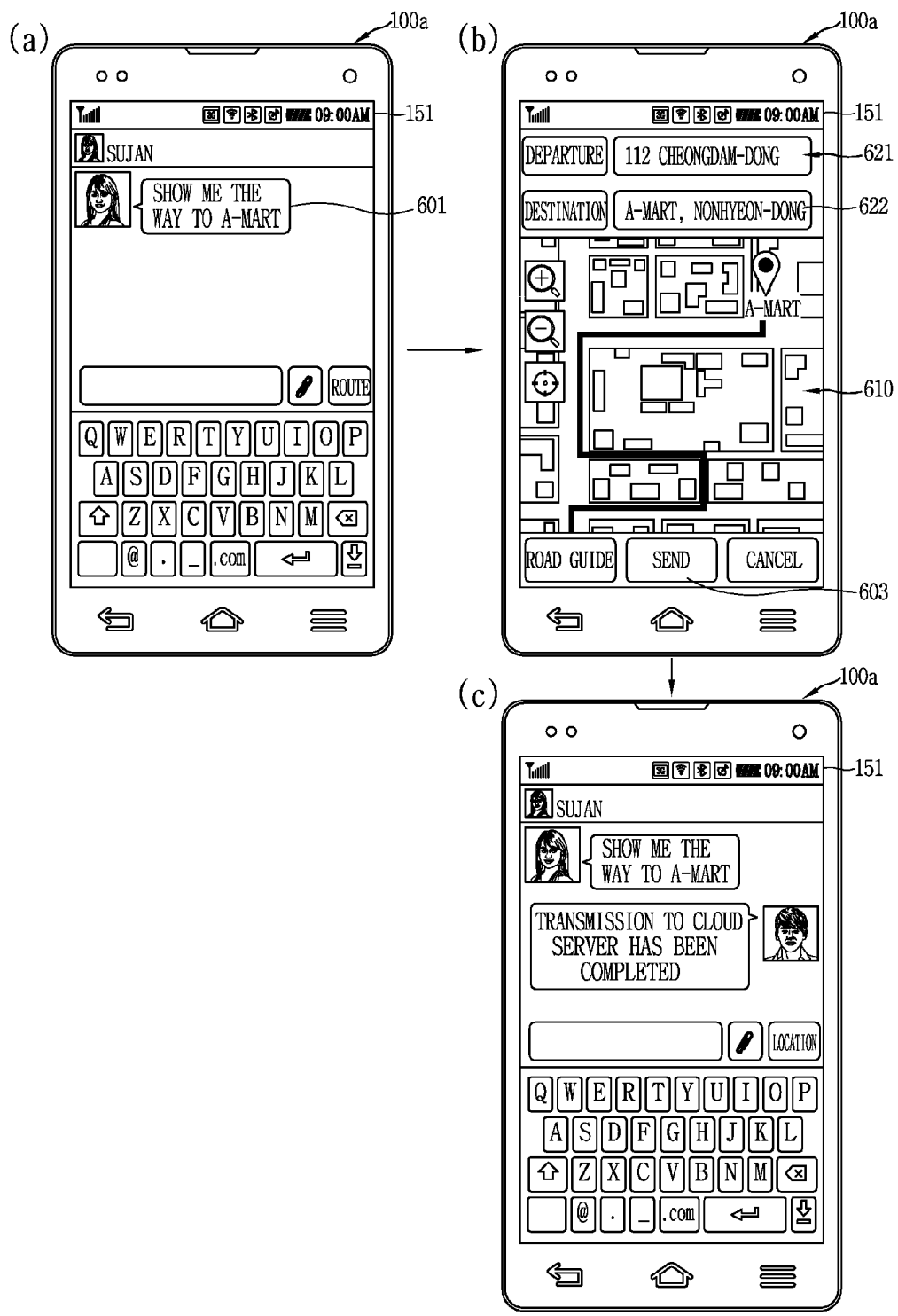
Figure 8:
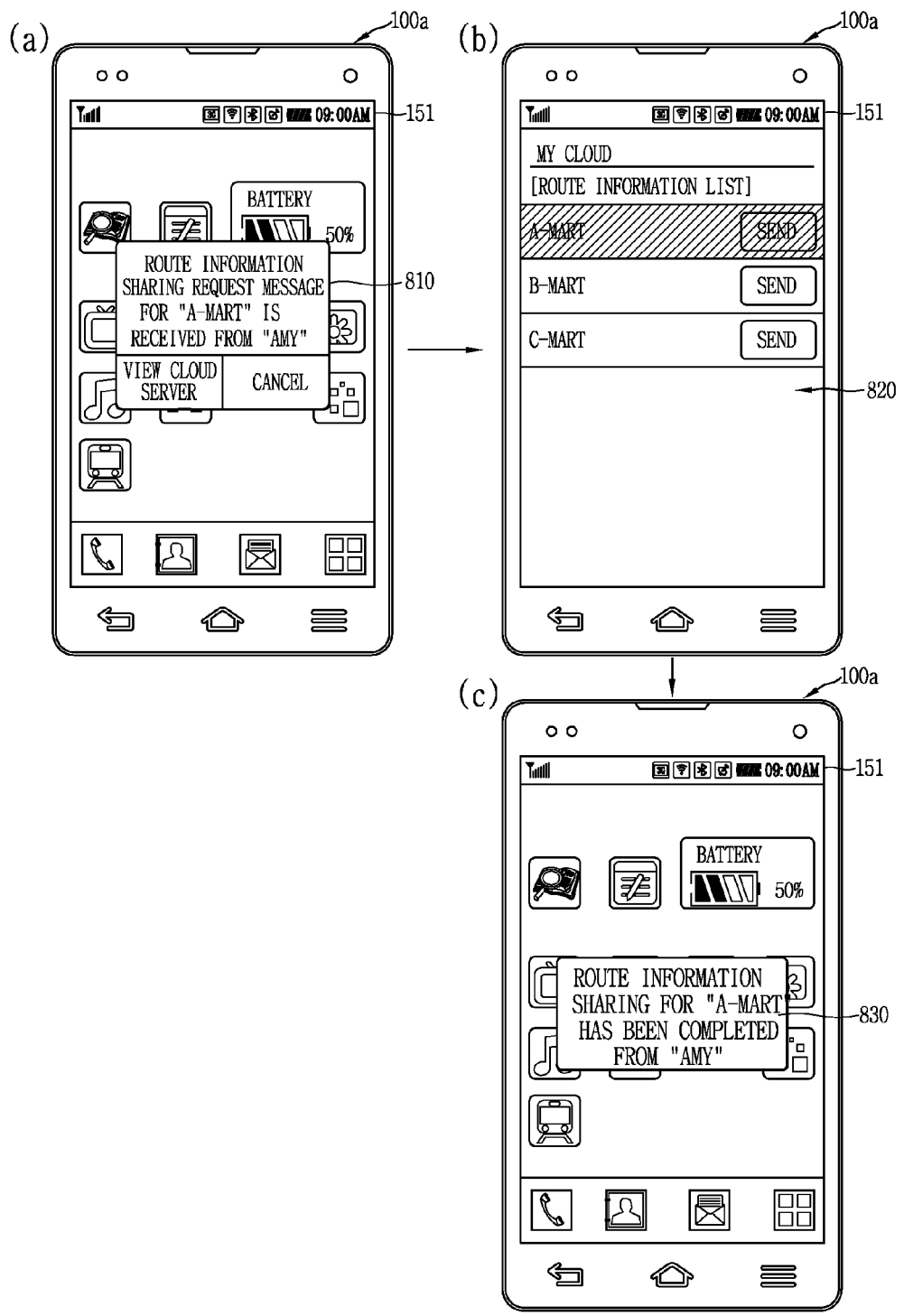
Figure 9:
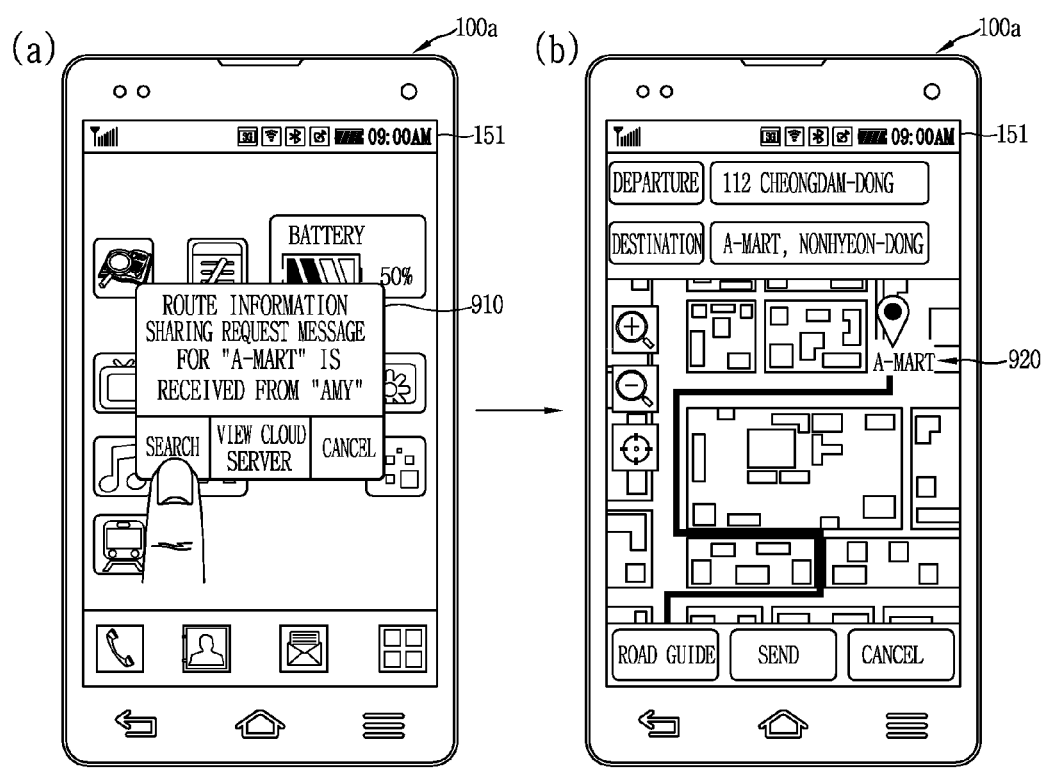

On the other hand, route information to be transmitted to the second terminal 100b may have been previously stored in the cloud server 200, and in this case, the controller of the first terminal 100a may select route information to be transmitted to the second terminal 100b among route information stored in the cloud server 200 with the help of the user without directly searching the route information as illustrated in FIGS. 7 and 8.

On the other hand, the first terminal 100a may transmit a route information transmission request message to the cloud server to transmit route information stored in the cloud server to the second terminal 100b based on a request by the second terminal 100b to which route information is to be transmitted.

As illustrated in FIGS. 8 and 9A, when route information is requested from the second terminal 100b, the controller of the first terminal 100a may inform that the route information has been requested from the second terminal 100b using a popup window 810. Meanwhile, a route information request from the second terminal 100b may be received in a push message format.

Furthermore, the route information request received from the second terminal 100b may include information associated with at least one of the departure (or current location of the second terminal 100b) and destination (or arrival). In this case, the controller of the first terminal 100a may automatically search route information on the departure and destination even when the user does not directly enter information on the departure and destination.

On the other hand, the controller of the first terminal 100a may implement a navigation function for searching route information using a touch input to the popup window 810 based on the route information being requested (refer to FIG. 9B).

On the other hand, when route information to be transmitted to the second terminal 100b has been previously stored in the cloud server 200, the controller of the first terminal 100a may not display a search icon (refer to FIG. 8A) for implementing a navigation function as illustrated in FIG. 8A. Accordingly, in this case, the controller of the first terminal 100a may display a list 820 containing items corresponding to route information stored in the cloud server 200, respectively, as illustrated in FIG. 8B. Then, when at least one item is selected by the user from the list 820, the cloud server 200 may transmit route information corresponding to the selected item to the second terminal 100b.

Figure 10:
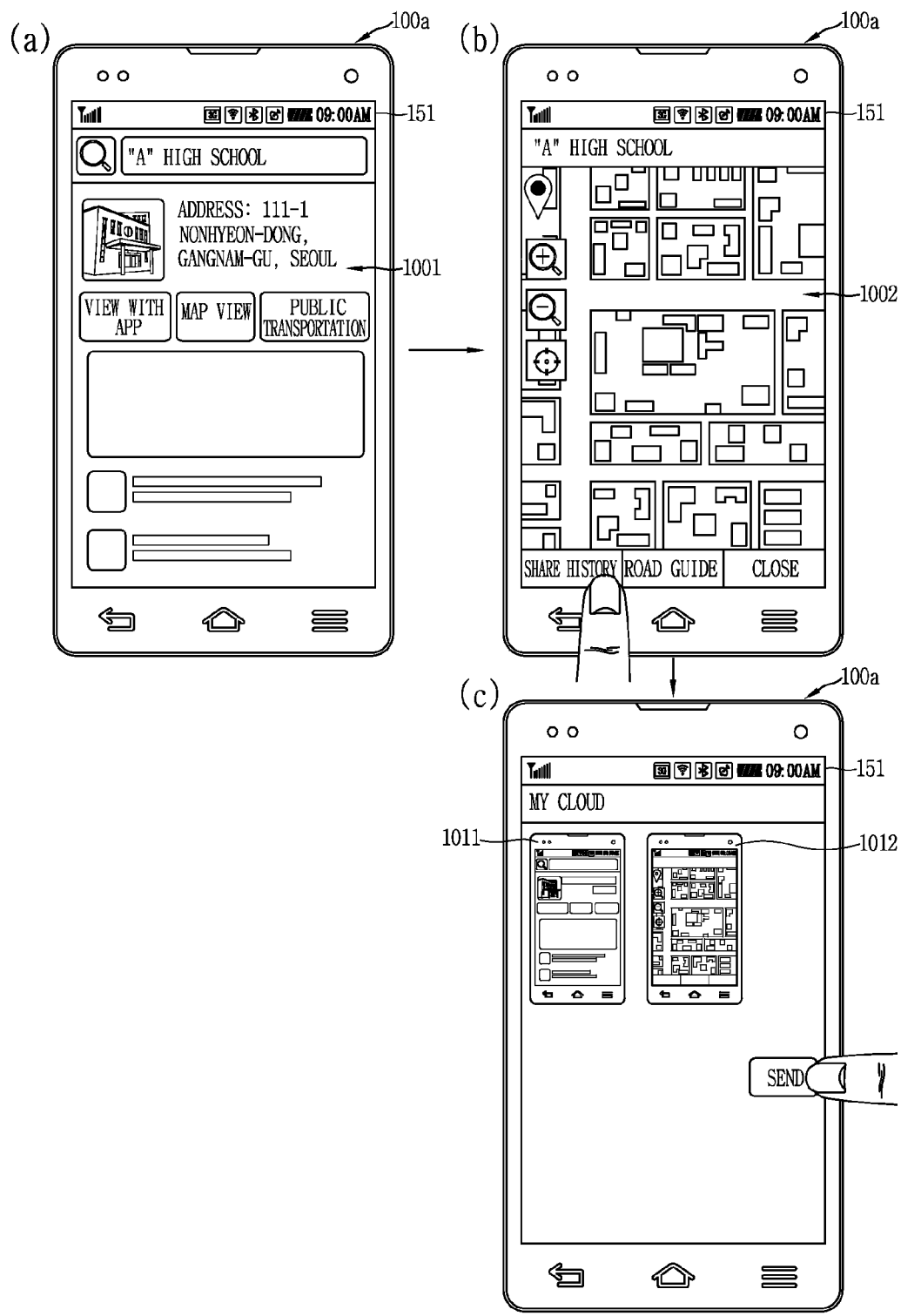
FIG. 10 is a conceptual view for explaining a method of transmitting history information in a mobile terminal according to an embodiment of the present disclosure.

Hereinafter, a method of sharing history information retrieved through a web which is not a navigation function in the first terminal 100a will be described in more detail with reference to the accompanying drawings. FIG. 10 is a conceptual view for explaining a method of transmitting history information in a mobile terminal according to an embodiment of the present disclosure.

The first terminal 100a is able to search route information through web surfing other than the method of searching route information through a previously installed navigation function. For example, as illustrated in FIG. 10A, the first terminal 100a is able to search a specific destination (for example, "A" high school) in an arbitrary website based on the user's selection.

Then, the controller of the first terminal 100a may store a series of processes for searching the route information in the memory. In other words, the controller may store history information corresponding to the route information retrieved from the website in the memory. Meanwhile, the history information may be stored in the sequence of retrieving the route information.

Furthermore, the history information can be uploaded to the cloud server based on the user's request as illustrated in FIGS. 10B and 10C. Furthermore, the history information uploaded to the cloud server may be transmitted to the second terminal 100b based on the user's selection of the first terminal 100a or a request from the second terminal 100b.

As described above, a mobile terminal and a cloud system using the same according to an embodiment of the present disclosure can provide route information using information acquired through a website even without using a navigation function.

Figure 11:
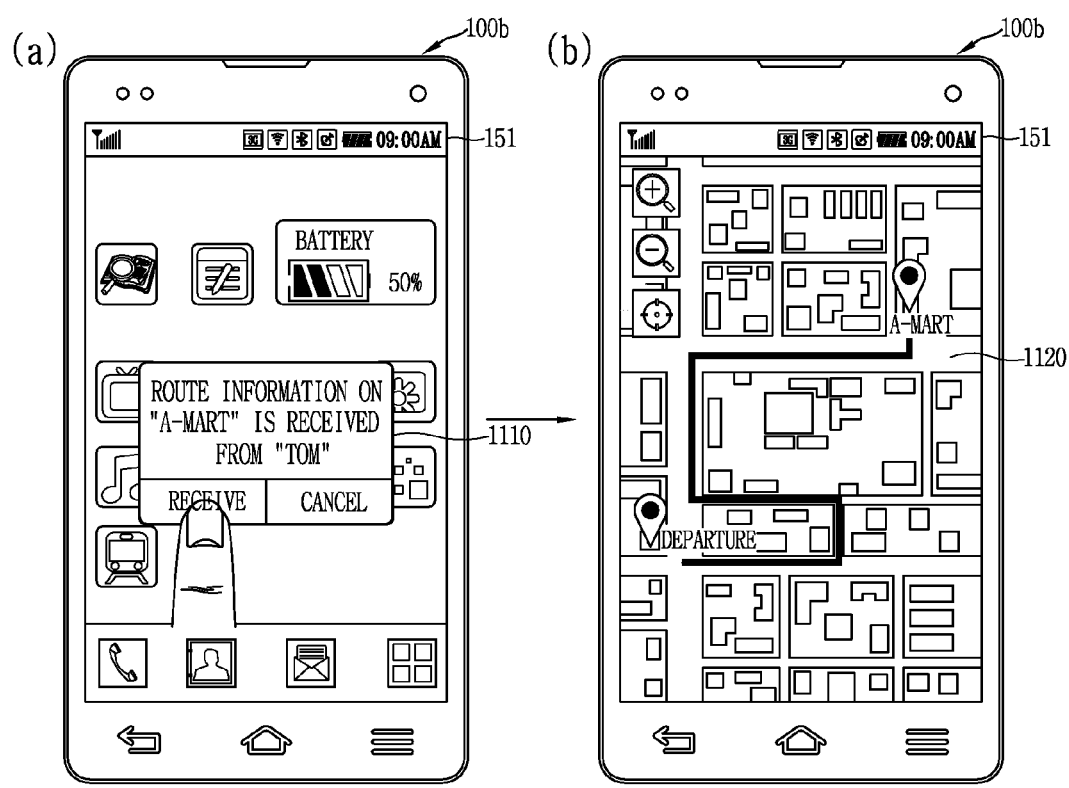
FIGS. 11, 12 and 13 are conceptual views for explaining a method of receiving route information and displaying the same in a mobile terminal according to an embodiment of the present disclosure.
Figure 12:
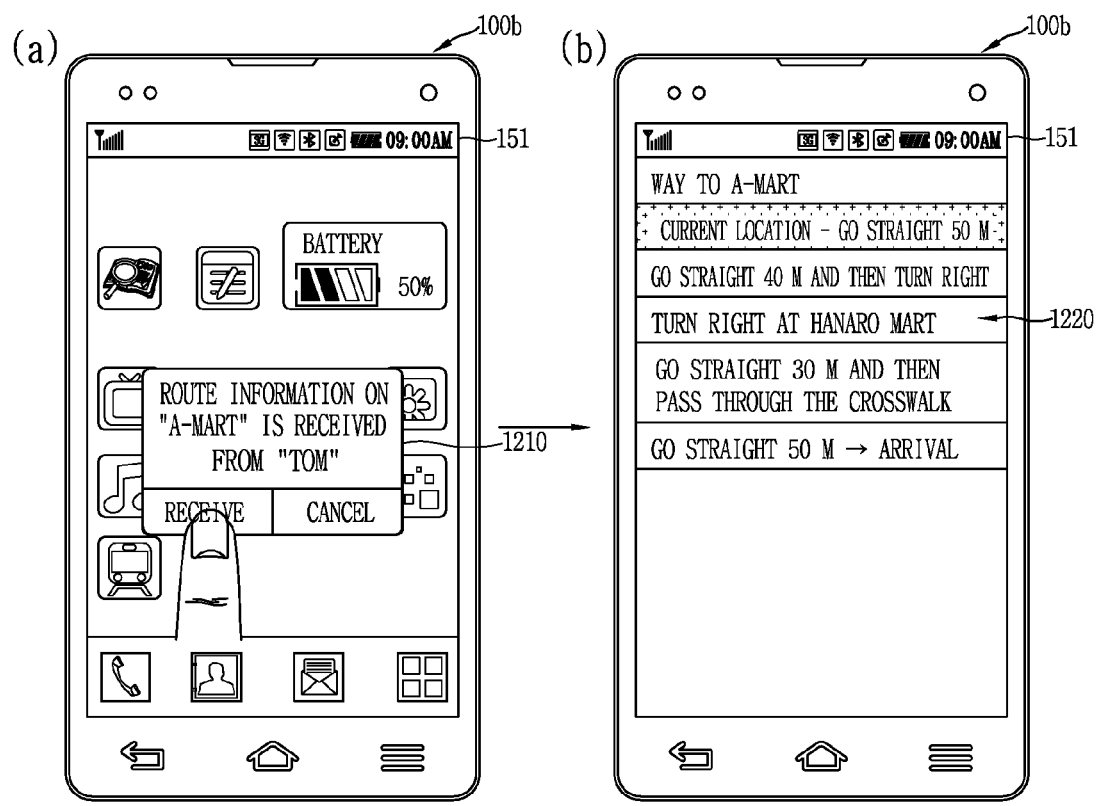
Figure 13:
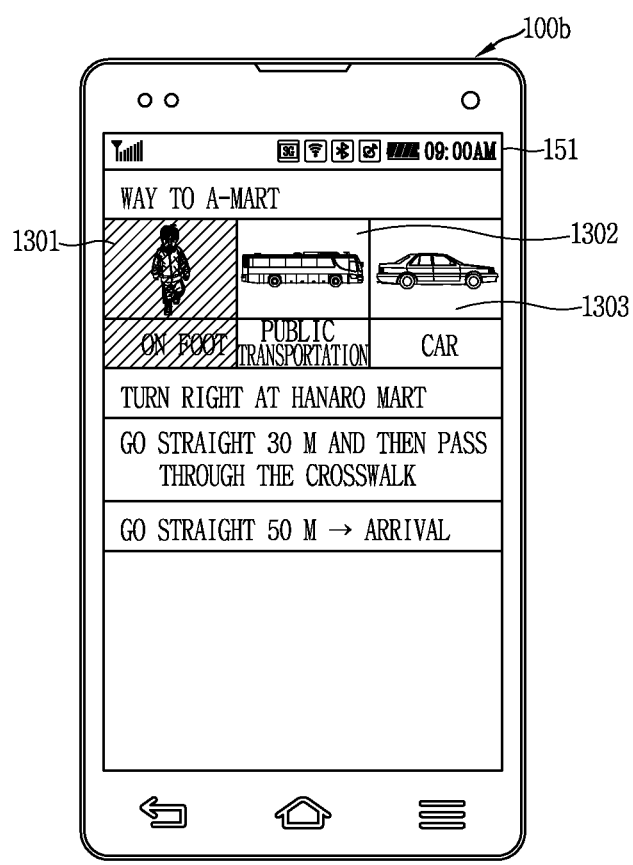

Hereinafter, a second terminal at the side of receiving route information from the cloud server will be described in more detail with reference to the accompanying drawings. FIGS. 11, 12 and 13 are conceptual views for explaining a method of receiving route information and displaying the same in a mobile terminal according to an embodiment of the present disclosure.

The second terminal 100b may receive route information from the cloud server 200 based on a request of the first terminal 100a. Such a request of the first terminal 100a is received at the cloud server 200, the cloud server 200 may first transmit a message notifying that there is route information to be transmitted to the second terminal 100b. In this case, notification information 1110 may be displayed on the second terminal 100b as illustrated in FIG. 11A. The notification information 1110 can be displayed through a popup window. Meanwhile, the cloud server 200 may transmit route information to the second terminal 100b only when a route information reception message is transmitted from the second terminal 100b. The second terminal 100b may transmit the route information reception message to the cloud server based on the user's selection through the popup window as illustrated in FIG. 11A.

On the other hand, when route information is received from the cloud server 200, the second terminal 100b may display the received route information using an electronic map 1120 as illustrated in FIG. 11B. Meanwhile, the electronic map 1120 may have been previously stored on the second terminal 100b.

Furthermore, route information received from the cloud server 200 can be displayed in a text format as illustrated in FIG. 12B. Meanwhile, the controller of the second terminal 100b may display the completed task (for example, "current location—go straight 50m") to be visually distinguished from the other tasks as illustrated in FIG. 12B or delete it.

On the other hand, route information transmitted from the cloud server 200 can be all received at once, and can be received at predetermined time intervals. Furthermore, the route information can be received in real time based on the location of the second terminal 100b being changed. In this case, the cloud server may transmit route information to the second terminal 100b only when there is preset event information for each interval. Here, the preset event information may be information associated with transportation such as turn left, turn right, go straight, go back, slow down, use a specific lane, accident occurrence and the like.

On the other hand, the cloud server 200 may transmit route information corresponding to at least one of on foot, public transportation and automobile, respectively, to the second terminal 100b. Accordingly, as illustrated in FIG. 13, the second terminal 100b may display route information corresponding to foot, public transportation or automobile based on the selection of any one of icons 1301, 1302, 1303 corresponding to foot, public transportation and automobile, respectively.

Figure 14:
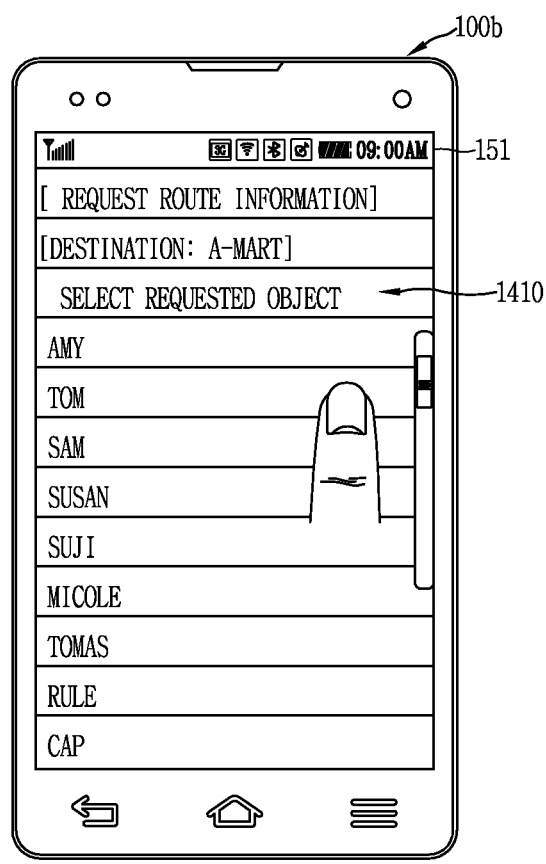
FIGS. 14 and 15 are conceptual views for explaining a method of requesting route information in a mobile terminal according to an embodiment of the present disclosure.
Figure 15:
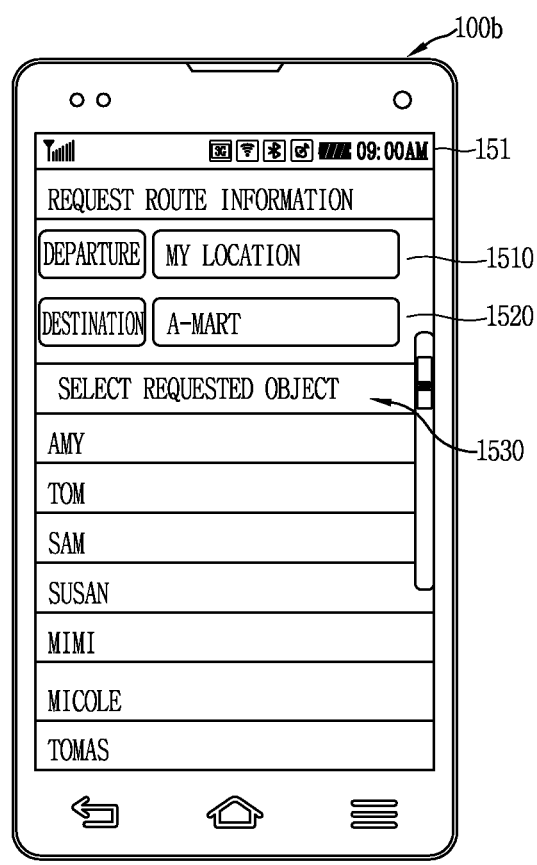

Hereinafter, a method of requesting route information to the first terminal 100a from the second terminal 100b will be described in more detail with reference to the accompanying drawings. FIGS. 14 and 15 are conceptual views for explaining a method of requesting route information in a mobile terminal according to an embodiment of the present disclosure.

The second terminal 100b may directly select an external terminal which is an object for providing route information, namely, the first terminal 100a. For example, as illustrated in FIGS. 14 and 15, a phone book or contact list 1410 stored in the memory may be displayed on the display unit of the second terminal 100b. Furthermore, the second terminal 100b may select any one contact with the help of the user in a state that the phone book is displayed thereon, thereby specifying the first terminal 100a.

On the other hand, the controller 180 of the second terminal 100b may transmit the identification information of the selected first terminal 100a to the cloud server. Here, the identification information of the first terminal 100a may have been previously stored in the second terminal 100b as described above, and otherwise, may be directly received from the user. Here, the identification information of the first terminal 100a may be an uniform resource identifier (URI), and more particularly, at least one of Tell URI and SIP URI.

On the other hand, the second terminal 100b can specify at least one of the departure and destination information other than specifying the first terminal as illustrated in FIGS. 14 and 15. The departure and destination information may be entered by the user or automatically entered by the controller. Moreover, the departure may be automatically entered with the current location of the second terminal 100b.

As described above, a mobile terminal and a cloud system using the same may use route information by providing it from the cloud server even when a navigation function is not provided therein.

Furthermore, a mobile terminal and a cloud system using the same according to an embodiment of the present disclosure may transmit route information provided through a first mobile terminal to a second mobile terminal using the cloud server based on the user's request. Accordingly, the user of the second mobile terminal may receive route information through the cloud server even when a navigation function is not provided in the second mobile terminal.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal and cloud system using the same, and all or part of each embodiment may be selectively combined and configured to make various modifications thereto.

What is claimed is:

1. A mobile terminal, comprising:
a touch screen;
a wireless communication unit; and
a controller configured to:
cause the touch screen to display an execution screen of a message application, wherein the execution screen includes a graphic object linked to a function for outputting map information;
cause the touch screen to display the map information when the graphic object is selected;
receive a user input for selecting specific location information via the displayed map information; and
cause the wireless communication unit to transmit the selected specific location information to at least one of an external terminal or a server such that the transmitted specific location information is output at the external terminal,
wherein the transmitted specific location information is indicated on an electronic map displayed at the external terminal.

2. The mobile terminal of claim 1, further comprising:
a navigation unit configured to search a travel route for reaching a destination corresponding to destination information received via the touch screen,
wherein the controller is further configured to cause the touch screen to display a route to the destination in a graphic format on the map information.

3. The mobile terminal of claim 2, wherein the controller is further configured to cause the touch screen to display a select window comprising at least one external terminal information to select the external terminal when the search of the travel route is completed.

4. The mobile terminal of claim 3, wherein the select window comprises at least a part of contact information contained in a previously stored phone book.

5. The mobile terminal of claim 2, wherein the controller is further configured to:
cause the wireless communication unit to transmit the destination information to the server, wherein the route corresponds to a travel route for the destination information.

6. The mobile terminal of claim 2, further comprising a memory configured to store information,
wherein the controller is further configured to cause the memory to store history information corresponding to retrieved route information from a web site, the history information stored in a sequence the retrieved route information was retrieved.

7. The mobile terminal of claim 6, wherein the controller is further configured to cause the wireless communication unit to transmit the history information to the server to transmit the history information to the external terminal.

8. The mobile terminal of claim 2, wherein the controller is further configured to cause the touch screen to display a menu for sharing information relating to the route while the route is displayed.

9. The mobile terminal of claim 1, wherein the external terminal is selected from a contact list by an input received via the touch screen.

10. The mobile terminal of claim 1, wherein the specific location information includes current location information of the mobile terminal.

11. The mobile terminal of claim 1, wherein the controller is further configured to cause the wireless communication unit to transmit route information associated with a current location of the mobile terminal and a specific location corresponding to the specific location information to the at least one of the external terminal or the server such that the route information is output at the external terminal.

12. The mobile terminal of claim 11, wherein the transmitted route information is indicated on the electronic map displayed at the external terminal.

13. A mobile terminal, comprising:
a wireless communication unit;
a touch screen; and
a controller configured to:
cause the touch screen to display map information;
select specific location information on the map information in response to a first user input;
cause the touch screen to display a contact list in response to a second user input; and cause the wireless communication unit to transmit the selected specific location information to at least one of an external terminal or a server such that the selected specific location information is output at the external terminal when a contact is selected from the contact list, wherein the external terminal corresponds to the selected contact and the transmitted specific location information is indicated on an electronic map displayed at the external terminal.

14. The mobile terminal of claim 13, wherein the specific location information includes current location information of the mobile terminal.

15. The mobile terminal of claim 13, wherein the controller is further configured to cause the wireless communication unit to transmit route information associated with a current location of the mobile terminal and a specific location corresponding to the specific location information to the at least one of the external terminal or the server such that the transmitted route information is output at the external terminal.

16. The mobile terminal of claim 15, wherein the transmitted route information is indicated on the electronic map displayed at the external terminal.

* * * * *